US010939672B2

(12) United States Patent
Chen et al.

(10) Patent No.: US 10,939,672 B2
(45) Date of Patent: Mar. 9, 2021

(54) EXPERIMENTAL DEVICE AND EXPERIMENTAL METHOD FOR STUDYING QUANTITATIVE RELATIONSHIP BETWEEN SPAWNING OF PARENT FISH AND STIMULATION OF FLOW VELOCITY

(71) Applicant: Nanjing Hydraulic Research Institute, Nanjing (CN)

(72) Inventors: Qiuwen Chen, Nanjing (CN); Yuqing Lin, Nanjing (CN); Jianyun Zhang, Nanjing (CN); Liuming Hu, Nanjing (CN); Yuxin Zhang, Nanjing (CN); Lei Tang, Nanjing (CN); Tiesheng Guan, Nanjing (CN); Yong Gao, Nanjing (CN); Wei Jiang, Nanjing (CN)

(73) Assignee: NANJING HYDRAULIC RESEARCH INSTITUTE, Nanjing (CN)

( * ) Notice: Subject to any disclaimer, the term of this patent is extended or adjusted under 35 U.S.C. 154(b) by 128 days.

(21) Appl. No.: 16/340,086

(22) PCT Filed: Aug. 1, 2018

(86) PCT No.: PCT/CN2018/097982
§ 371 (c)(1),
(2) Date: Apr. 5, 2019

(87) PCT Pub. No.: WO2019/033924
PCT Pub. Date: Feb. 21, 2019

(65) Prior Publication Data
US 2020/0383302 A1     Dec. 10, 2020

(30) Foreign Application Priority Data

Aug. 18, 2017  (CN) .......................... 201710710122.3

(51) Int. Cl.
*A01K 61/95*   (2017.01)
*A01K 61/17*   (2017.01)
(Continued)

(52) U.S. Cl.
CPC .............. *A01K 61/95* (2017.01); *A01K 61/17* (2017.01); *A01K 69/04* (2013.01); *F04D 13/086* (2013.01); *G01F 9/008* (2013.01)

(58) Field of Classification Search
CPC ........ A01K 61/90; A01K 61/95; A01K 61/17; A01K 69/04; A01K 61/10; A01K 63/003;
(Continued)

(56) References Cited

U.S. PATENT DOCUMENTS

| | | | |
|---|---|---|---|
| 10,039,244 B2* | 8/2018 | Shoham | A01K 61/00 |
| 2004/0009040 A1* | 1/2004 | Boylan | E02B 8/085 |
| | | | 405/83 |
| 2005/0120970 A1* | 6/2005 | Massingill | A01K 63/00 |
| | | | 119/216 |

FOREIGN PATENT DOCUMENTS

CN   204837568 U   * 12/2015
CN   105401554 A   *  3/2016
(Continued)

*Primary Examiner* — Magdalena Topolski
*Assistant Examiner* — Katelyn T Truong
(74) *Attorney, Agent, or Firm* — CBM Patent Consulting, LLC

(57) ABSTRACT

A experimental device is specifically an annular water tank formed by a first arc-shaped water tank, a first special-shaped water tank, a second arc-shaped water tank and a second special-shaped water tank which are sequentially connected head to tail, and the outer perimeter is 70 m to 110 m, wherein the inner walls of both the first special-shaped water tank and the second special-shaped water tank are flat, both of the widths between the outer walls and the inner walls are gradually increased from the two ends to the middle, and water flow pushing equipment which are
(Continued)

capable of enabling the maximum water flow velocity in the experimental device to reach a preset value are respectively placed in the first special-shaped water tank and the second special-shaped water tank.

8 Claims, 4 Drawing Sheets

(51) Int. Cl.
    *A01K 69/04*     (2006.01)
    *F04D 13/08*     (2006.01)
    *G01F 9/00*     (2006.01)

(58) Field of Classification Search
    CPC ......... A01K 63/02; G01F 9/008; E02B 8/085; F04D 13/086
    See application file for complete search history.

(56) References Cited

FOREIGN PATENT DOCUMENTS

| | | | |
|---|---|---|---|
| JP | 3194606 U * | 12/2014 | |
| WO | WO-2008032102 A2 * | 3/2008 | ............ A01K 63/00 |
| WO | WO-2019240588 A1 * | 12/2019 | ............ A01K 61/95 |

* cited by examiner

EXPERIMENTAL DEVICE AND EXPERIMENTAL METHOD FOR STUDYING QUANTITATIVE RELATIONSHIP BETWEEN SPAWNING OF PARENT FISH AND STIMULATION OF FLOW VELOCITY

TECHNICAL FIELD

The present invention relates to the technical field of ecology, and in particular to an experimental device and method for studying a quantitative relationship between spawning behaviors of parent fish and stimulation of flow velocity.

BACKGROUND ART

The main reproduction sites of the four major Chinese carps (grass carp, black carp, silver carp and bighead carp) in China are located in the Yangtze River, the output accounts for about 70% of the total national output, and the reproduction period is mainly from May to July each year. Since the 1980s, there has been a serious decline in the resources of the four major Chinese carps. Affected by the operation and regulation of the Three Gorges Project since 2003, the hydraulic conditions of the middle and lower reaches of the river have changed. The spawning sites of the four major Chinese carps have undergone some changes, such as scale reduction, merger and location migration. The resources of the four major Chinese carps have declined significantly. According to the survey and statistics, the total number of fish eggs in the downstream Jianli section of the Three Gorges Project decreased from 115 billion in the 1960s to 2.85 billion, 1.9 billion and 1.9 billion in 2000-2002 before the impoundment of the Three Gorges Reservoir. After the operation of the Three Gorges Reservoir, the runoff of eggs decreased further, to 90 million, 180 million, 40 million and 420 million in 2007-2010, respectively. Since 2011, in order to promote the breeding of Chinese carps, the ecological operation of the Three Gorges Reservoir has been carried out annually, and the runoff of the spawns and fries of the four major Chinese carps has increased. However, the theoretical basis of the current operation is mainly based on the analysis and summary of historical hydrological data, and the driving mechanism of flow factors on the spawning behaviors of fish is still unclear.

In order to further improve the reproduction profit of Chinese carps and reveal the suitable flow conditions for spawning of fishes, scholars at home and abroad have carried out a lot of studies on the flow characteristics of different fish spawning sites. When Moir H J, et al., studied the spawning sites of Atlantic salmon in Scotland, local water depth, flow velocity and Froude number were selected as variables to describe the hydraulic characteristics of the spawning sites. Peggy Z, et al., numerically simulated the spawning sites of Atlantic salmon and brown trout in Western Norway, and studied the effects of flow velocity, water depth, flow rate and sediment. Chen Yongbai, et al., analyzed the hydrodynamic characteristics of the spawning sites of the four major Chinese carps, and found that the spawning positions of the Chinese carps were mostly located in the river section with large topographic changes. Chen Mingqian, et al., divided the spawning site characteristics of fish into three levels, i.e. geometric shape characteristics, water kinematic characteristics and water dynamic characteristics. Wang Yuankun, et al., calculated and analyzed the turbulent kinetic energy of fish spawning sites, and found that one of the important reasons for the formation of fish spawning sites was the loss of water flow energy. Most of these studies focused on the hydrological situation of spawning sites, and lacked in-depth studies on fish behaviors.

In order to explore the effects of hydrodynamic conditions on fishes, Liu Wen, et al., (2009) built an annular ecological water tank with the flow velocity which gradually changes. In the water tank, crucian carp of Cyprinidae were selected as representatives to carry out model tests. Three hydrodynamic characteristics, namely flow velocity, flow velocity gradient and kinetic energy gradient, were selected to quantify the demand of fish growth for hydrodynamic conditions. In terms of patents, "Experimental Apparatus for Testing Stress Reaction of Fishes to Currents" (CN201220732987.2) has disclosed an experimental apparatus for testing stress reaction of fish to currents, including an experimental pond and a sensing and monitoring device; advection and circulation generating devices at the surface and bottom layers are arranged in the experimental pond to generate lateral circulation and horizontal advection; and the sensing and monitoring device is arranged above the experimental pond for monitoring the stress behavior of experimental fish. The utility model can simulate various water flow conditions, record and study the behavior characteristics of fish under different water flow conditions, and the stress reaction of adaptive fishes with biochemical components in vivo to the water flow. However, the similar studies in this type of patents or literature only focus on fish swimming behaviors, and lack of revealing the triggering mechanism of fish spawning behaviors.

It has been found by studies that flow velocity is the key driving factor to induce spawning of the four major Chinese carps. However, there are no experimental methods and devices for studying stimulation of flow velocity on spawning of parent fish by using large-size water tank experiments. The main reason for this is that the body length of the spawning parent fish is relatively great (the body length of the parent fish of the four major Chinese carps is 0.6 m to 1 m), and the suitable spawning flow velocity ranges from 1.0 m/s to 1.65 m/s. In a large-size water tank, how to construct a suitable flow velocity and a diverse flow environment to stimulate spawning of parent fish is the focus of the study in the present invention.

SUMMARY OF THE INVENTION

Purpose of the Invention

The present invention provides an experimental device and method for studying a quantitative relationship between spawning behaviors of parent fish and stimulation of flow velocity in view of the problems in the prior art. The experimental device provided by the present invention is suitable for studies on spawning of large parent fish, can provide a complex flow field of various flow patterns for parent fish in the experimental area, is more similar to a natural river channel, and is suitable for studies on spawning of parent fish.

Technical Solution

An experimental device for studying a quantitative relationship between spawning of parent fish and stimulation of flow velocity provided by the present invention is an annular water tank having an outer perimeter of 70 m to 110 m and formed by a first arc-shaped water tank, a first special-shaped water tank, a second arc-shaped water tank and a second special-shaped water tank which are sequentially connected head to tail, wherein the inner walls of both the first special-shaped water tank and the second special-shaped water tank are flat, both of the widths between the outer walls and the inner walls are gradually increased from the two ends to the middle, and water flow pushing equipment which are capable of enabling the maximum water flow velocity in the water tank to reach a preset value are respectively placed in the first special-shaped water tank and the second special-shaped water tank. The present invention combines the special-shaped water tanks with the arc-shaped water tanks, and can form different flow patterns in different experimental areas. Specifically, due to the change of angle at the junctions of the special-shaped water tanks and the arc-shaped water tanks, some backflows will occur, the flow velocity is small, and these areas can be used as fish rest areas, while in the arc-shaped water tanks, the flow velocity reaches the maximum, and these areas can be used as spawning flow velocity stimulation areas. For example, when the maximum flow velocity is 1.2 m/s, complex flow fields of various flow patterns such as 0.35 m/s, 0.5 m/s, 1.0 m/s and 1.2 m/s can be formed in the annular water tank. The flow velocity of 0.35 m/s is used for fish to rest when the fish are tired and the flow velocity of 1.2 m/s is used for stimulating spawning.

Herein, in order to adapt to the survival of the parent fish whose body length is 0.6 to 1 m, the experimental device provided by the present invention is configured to be a large-size water tank. Specifically, the outer wall radiuses of the first arc-shaped water tank and the second arc-shaped water tank are 7 m to 12 m, the widths are 0.5 m to 1.2 m and the depths are 1 m to 2 m; and the lengths of the inner walls of both the first special-shaped water tank and the second special-shaped water tank are 11 m to 20 m, the widths are 1 m to 2.5 m and the depths are 1 m to 3 m.

Further, in order to obtain a complex flow field more suitable for fish spawning experiments, the shapes of the special-shaped water tanks in the present invention are specifically as follows: the outer wall of the first special-shaped water tank consists of a first inclined wall, a first straight wall and a second inclined wall which are sequentially connected, the first straight wall is parallel to the inner wall of the first special-shaped water tank, the first inclined wall is connected with the outer wall of the first arc-shaped water tank, and the second inclined wall is connected with the outer wall of the second arc-shaped water tank; and the outer wall of the second special-shaped water tank consists of a third inclined wall, a second straight wall and a fourth inclined wall which are sequentially connected, the second straight wall is parallel to the inner wall of the second special-shaped water tank, the third inclined wall is connected with the outer wall of the first arc-shaped water tank, and the fourth inclined wall is connected with the outer wall of the second arc-shaped water tank. The angles of the inclined walls of the special-shaped water tanks are specifically as follows: the included angle $\theta 1$ between the first inclined wall and the inner wall of the first special-shaped water tank satisfies $5°≤\theta 1≤30°$; the included angle $\theta 2$ between the second inclined wall and the inner wall of the first special-shaped water tank satisfies $5°≤\theta 2≤30°$; the included angle $\theta 3$ between the first inclined wall and the inner wall of the second special-shaped water tank satisfies $5°≤\theta 3≤30°$; and the included angle $\theta 4$ between the second inclined wall and the inner wall of the second special-shaped water tank satisfies $5°≤\theta 4≤30°$. On the one hand, the design of the outer walls of the special-shaped water tanks can allow that there are positions for placing the water flow pushing equipment in the special-shaped water tanks; and on the other hand, the flow field can be enabled to be complex. In addition, if the angle of the outer walls is too large, the area occupied by the water tanks will be too large, and an excessive obstruction is caused to the flow velocity, such that the maximum flow velocity in the arc-shaped water tanks cannot meet the requirements. Therefore, the angle of 5° to 30° is the most reasonable.

Further, a first baffle is arranged along a length direction in the first special-shaped water tank, and the two ends of the first baffle are respectively connected to the outer wall of the first special-shaped water tank by adoption of fish stopping nets; and a second baffle is arranged along a length direction in the second special-shaped water tank, and the two ends of the second baffle are respectively connected to the outer wall of the second special-shaped water tank by adoption of fish stopping nets. A first flow pusher is placed in an area surrounded by the first baffle, the outer wall of the first special-shaped water tank and the fish stopping nets, and a second flow pusher is placed in an area surrounded by the second baffle, the outer wall of the second special-shaped water tank and the fish stopping nets. If the power of the flow pushers is not enough, a first submersible pump may be arranged at the junction of the first special-shaped water tank and the first arc-shaped water tank, a second submersible pump may be arranged at the junction of the second special-shaped water tank and the first arc-shaped water tank, a third submersible pump may be arranged at the junction of the first special-shaped water tank and the second arc-shaped water tank, and a fourth submersible pump may be arranged at the junction of the first special-shaped water tank and the first arc-shaped water tank. The flow pushers and the submersible pumps are water flow pushing equipment that can enable the maximum water flow velocity in the experimental device to reach a preset value. During experiments, the water flow pushing equipment is started according to the needs. The baffles play a role of separating the flow pushers from fish on the one hand, and can produce more complex flow fields in the special-shaped water tanks on the other hand.

The experimental method for studying a quantitative relationship between spawning of parent fish and stimulation of flow velocity provided by the present invention adopts the experimental device to perform studying, and specifically comprises:

(1) injecting water into the annular water tank to enable the water level in the tank to meet an experimental requirement, and removing impurities and harmful substances in the water;

(2) transferring parent fish samples into the annular water tank to adapt for 6 hours or more;

(3) in a range of velocities suitable for the parent fish to survive, alternately selecting a plurality of velocities respectively as maximum flow velocity for each working condition;

(4) according to set working conditions, starting water flow pushing equipment to enable the maximum flow velocity of a water flow to reach a preset value, executing for 2 hours to 2 days under each working condition, respectively recording the spawning situation of the parent fish under each working condition, simultaneously monitoring water quality and parent fish behaviors in real time, cleaning in time or changing water when the water quality is lower than a preset value, stopping the water flow pushing equipment to suspend the experiment when the parent fish are exhausted, and continuing the experiment after the parent fish renew physical strength; and (5) performing sorting to obtain the spawning situation of the parent fish under the stimulation of maximum flow velocity under each working condition.

Herein, the number of the working conditions is four, and the maximum flow velocity under each working condition and combinations of water flow pushing equipment that need to be started in order to reach the maximum flow velocity are specifically shown in the following table:

| Working condition | Maximum flow velocity | Combination way of water flow pushing equipment |
|---|---|---|
| 1 | 1.0 m/s | First submersible pump + third submersible pump or second submersible pump + fourth submersible pump |
| 2 | 1.2 m/s | First submersible pump + third submersible pump + first flow pusher + second flow pusher or second submersible pump + fourth submersible pump + first flow pusher + second flow pusher |
| 3 | 1.4 m/s | First submersible pump + second submersible pump + third submersible pump + fourth submersible pump |
| 4 | 1.6 m/s | First submersible pump + second submersible pump + third submersible pump + fourth submersible pump + first flow pusher + second flow pusher |

Beneficial Effects: Compared with the prior art, the present invention has the following remarkable advantages:

1. The experimental device designed by the present invention is a large-size water tank. Compared with the traditional small-size water tank, the present invention is more suitable for the study on the spawning behaviors of parent fish with body length of 0.6 m to 1 m.

2. The traditional circular or square water tank has almost the same flow velocity in each area, so it is not suitable for the study on the spawning of parent fish. The experimental device designed by the present invention combines the special-shaped water tanks with the arc-shaped water tanks, and can provide different flow patterns in different areas to stimulate spawning of parent fish (for example, under the working condition of maximum flow velocity of 1.2 m/s, it can simultaneously provide complex flow fields of various flow patterns such as 0.35 m/s, 0.5 m/s, 1.0 m/s and 1.2 m/s), the high-velocity areas are used to stimulate parent fish to spawn, the low-velocity areas are used for parent fish to rest, and this also makes it more similar to natural rivers.

3. According to the requirement on flow velocity for spawning of parent fish, the experimental method provided by the present invention designs different flow velocity and variable rate working conditions, studies the relationship between flow velocity and spawning of parent fish, and can provide a scientific reference for the fine ecological operation of the Three Gorges Reservoir.

DETAILED DESCRIPTION OF THE INVENTION

Figure 1:
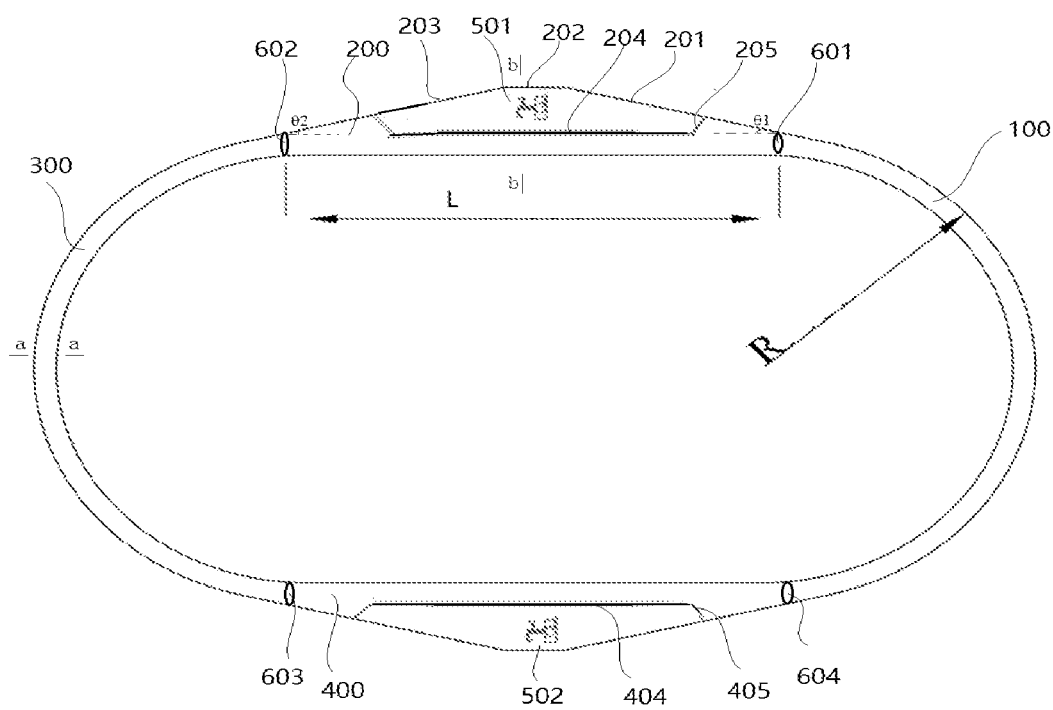
FIG. 1 is a top structural schematic view of an experimental device in the present invention.

FIG. 1 illustrates one embodiment of an experimental device provided by the present invention. The experimental device is specifically an annular water tank formed by a first arc-shaped water tank 100, a first special-shaped water tank 200, a second arc-shaped water tank 300 and a second special-shaped water tank 400 which are sequentially connected head to tail, the radiuses R of the outer walls of the first arc-shaped water tank 100 and the second arc-shaped water tank 300 are 7 m to 12 m, the widths are 0.5 m to 1.2 m and the depth are 1 m to 2 m; the lengths L of the inner walls of the first special-shaped water tank 200 and the second special-shaped water tank 400 are 11 m to 20 m, the widths are 1 m to 2.5 m, the depths are 1 m to 3 m, and the outer perimeter of the annular water tank is 70 m to 110 m. The annular water tank may be designed symmetrically or asymmetrically, that is, the perimeters of the first arc-shaped water tank 100 and the second arc-shaped water tank 300 are not the same, or the perimeters of the first special-shaped water tank 200 and the second special-shaped water tank 400 are not the same, both of which can realize the complex flow field. However, the symmetrical design has a better effect, and control and experimental studies can be better performed. The following description is made by adoption of the symmetrical design as an example.

As illustrated in FIG. 1, the inner walls of both the first special-shaped water tank 200 and the second special-shaped water tank 400 are flat, and both of the widths between the outer walls and the inner walls are gradually increased from the two ends to the middle, which enables the outer walls of the first special-shaped water tank 200 and the second special-shaped water tank 400 to be roughly isosceles trapezoidal. Specifically, the outer wall of the first special-shaped water tank 200 consists of a first inclined wall 201, a first straight wall 202 and a second inclined wall 203 which are sequentially connected, the first straight wall 202 is parallel to the inner wall of the first special-shaped water tank 200, the first inclined wall 201 is connected with the outer wall of the first arc-shaped water tank 100, and the second inclined wall 203 is connected with the outer wall of the second arc-shaped water tank 300, wherein a tangent connection is most preferably. The second special-shaped water tank 400 and the first special-shaped water tank 200 are symmetrically designed. Understandably, the outer walls of the first special-shaped water tank 200 and the second special-shaped water tank 400 may also be isosceles triangular, i.e., there is no first straight wall and no second straight wall.

Figure 2:
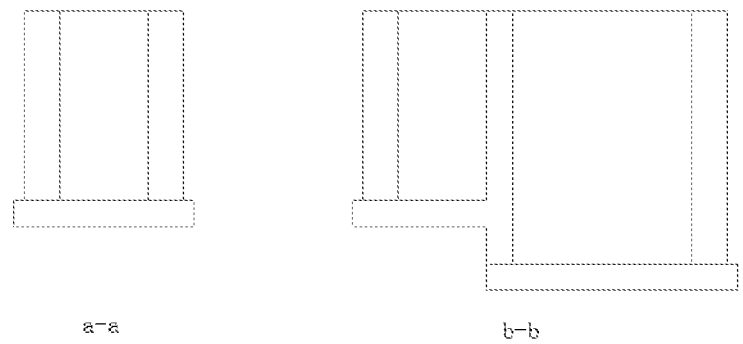
FIG. 2 is cross-sectional views of a-a and b-b in FIG. 1.

Water flow pushing equipment that can enable the maximum flow velocity to reach a preset value are also placed in the first special-shaped water tank 200 and the second special-shaped water tank 400, which may be a combination of flow pushers and submersible pumps. As illustrated in FIG. 1, a first baffle 204 is arranged along a length direction in the first special-shaped water tank 200, the two ends of the first baffle 204 are respectively connected to the outer wall of the first special-shaped water tank 200 by adoption of fish stopping nets 205, and a first flow pusher 501 is placed in a surrounded area; and a second baffle 404 is arranged along a length direction in the second special-shaped water tank 400, the two ends of the second baffle 404 are respectively connected to the outer wall of the second special-shaped water tank 400 by adoption of fish stopping nets 405, a second flow pusher 502 is placed in a surrounded area, and the depth of the bottom of the pusher is about 1 m deeper than that of the outside of the baffle, as illustrated in FIG. 2. Herein, the first baffle 204 and the second baffle 404 may be cement walls or finished plates, and each flow pusher has blades and may hurt fish during rotation. Therefore, the fish stopping nets and the baffles are adopted to for separation, the length l of the first baffle satisfies l=k*L, and L represents the length of the inner wall of the first special-shaped water tank, k=0.6-0.9; the length of the second baffle is equal to the length of the first baffle, and as verified by simulation analysis and experiments, the baffle with this length can provide a complex flow field more suitable for studies on spawning. In addition, if the flow pushers do not reach the preset maximum flow velocity, submersible pumps may also be additionally arranged. Specifically, a first submersible pump 601 is arranged at the junction of the first special-shaped water tank 200 and the first arc-shaped water tank 100, a second submersible pump 602 is arranged at the junction of the first special-shaped water tank 200 and the second arc-shaped water tank 300, a third submersible pump 603 is arranged at the junction of the second special-shaped water tank 400 and the first arc-shaped water tank 100, and a fourth submersible pump 604 is arranged at the junction of the second special-shaped water tank 400 and the first arc-shaped water tank 100. The submersible pumps have no blades and thus do not injure the fish. It should be noted that the baffles and fish stopping nets may be removed if water flow pushing equipment that does not injure the fish is placed in the special-shaped water tanks.

The included angle θ1 between the first inclined wall 201 and the inner wall of the first special-shaped water tank 200 satisfies 5°≤θ1≤30'; the included angle θ2 between the second inclined wall 203 and the inner wall of the first special-shaped water tank 200 satisfies 5°≤θ2≤30'; and the second special-shaped water tank 400 is symmetrically arranged. The design of the included angles between the inclined walls and the inner walls of the special-shaped water tanks can reduce the area of water, and can also create a variety of flow velocity zones.

Figure 3:
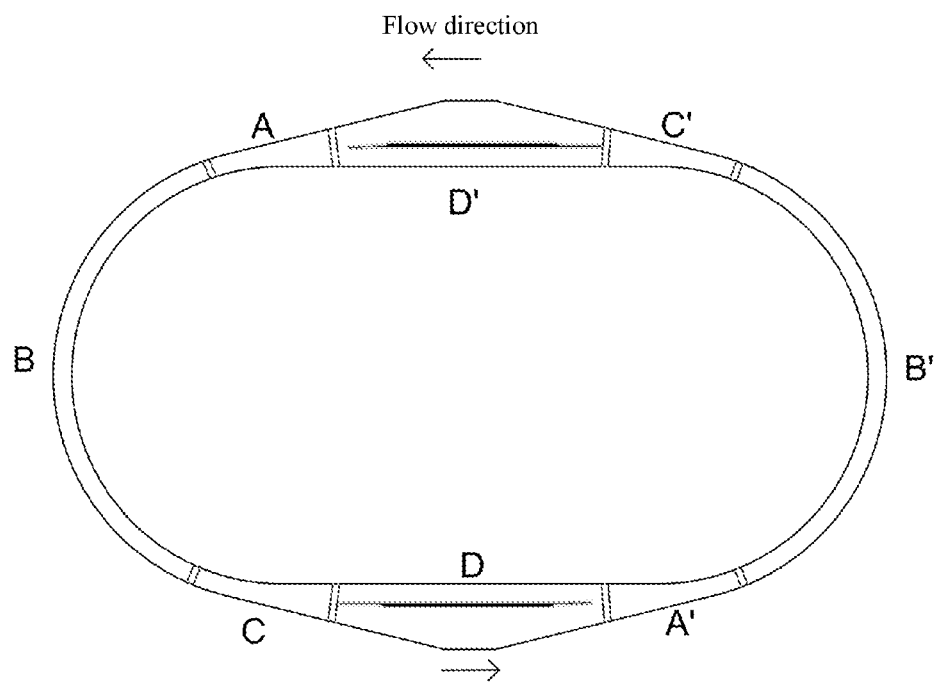
FIG. 3 is a schematic view of flow field zoning of the experimental device in the present invention.

The principle that the device generates a complex flow field is as follow: as illustrated in FIG. 3, the water tank is divided into eight zones, with four zones on the left and other four zones on the right, which are symmetrical in pairs, wherein A and A' are backflow zones; B and B' are experimental zones; and C, C', D and D' are slow flow zones. Because of the contact between the special-shaped water tank and the arc-shaped water tank, some backflows are produced in zones A and A', the flow velocity is small and these zones may be used as fish rest zones; C and C' are the inlet zones of the flow pushers, the area is large, the flow velocity is also relatively small, and these zones may also be used as fish rest zones; B and B' are in the arc-shaped water tanks, there is no obstruction and the flow velocity reaches the maximum; and due to flow division, the flow velocity in D and D' is slower than that in B and B'.

Figure 4:
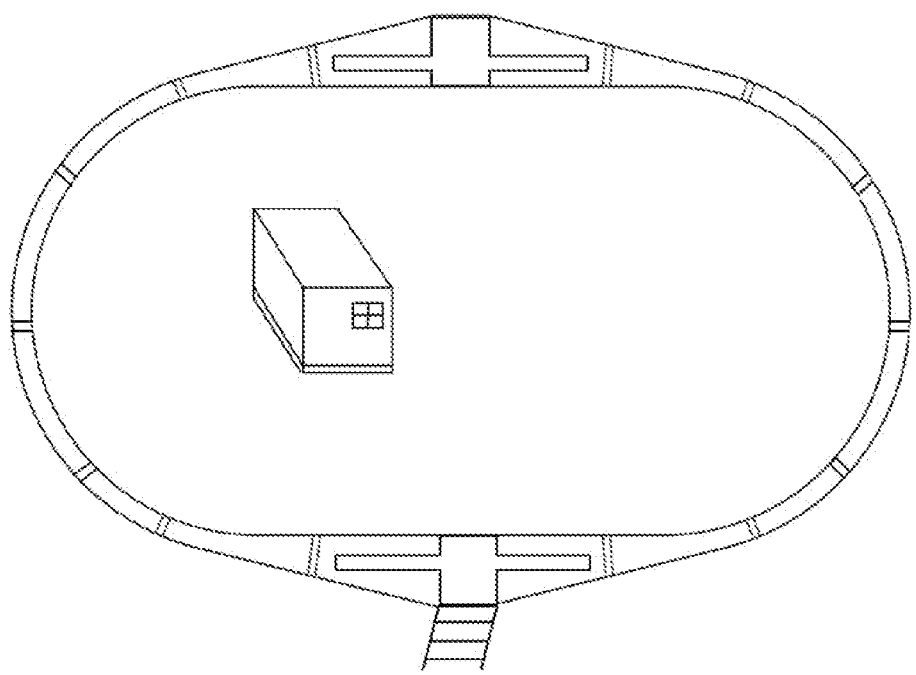
FIG. 4 is an actual structural view of the experimental device in the present invention.

Experiments on spawning of parent fish will be performed based on the annular water tank:

1. The parameters of the annular water tank were configured as follows: The outer diameter of the arc-shaped water tanks was 18 m, the length of the inner walls of the special-shaped water tanks was 15 m, the outer perimeter of the water tank was 87.33 m, the inner perimeter was 81.90 m, the width was 0.74 m and the depth was 1.70 m. For the actual situation, see FIG. 4.

Figure 5:
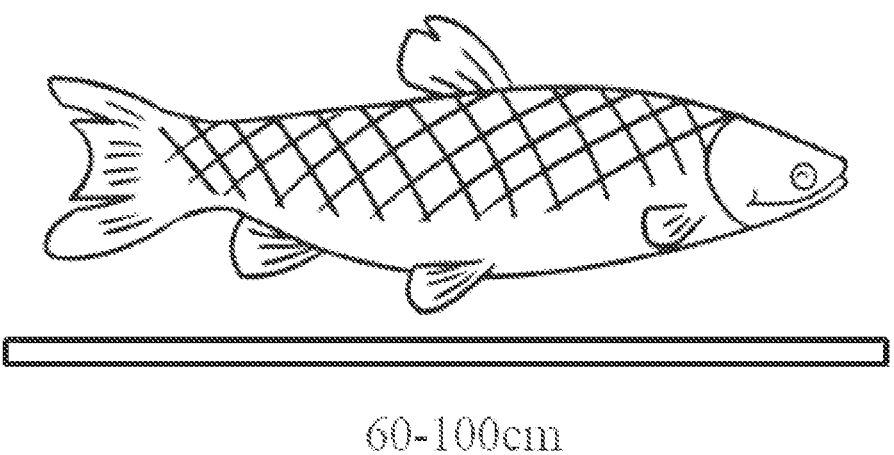
FIG. 5 is a schematic view of parent fish.

2. Preparation for experimental fish: Experimental fish were mature grass carp parent fish, as illustrated in FIG. 5, they were purchased in two batches, during the on-site acceptance period, they were identified by professionals, the gonad development period of the purchased parent fish was at stage IV or above, and they had spawning conditions. In the first batch, totally 23 parent fish (15 females and 8 males) were purchased, wherein 4 female fish escaped from the net during the temporary cultivation period, and the number of the actual experimental fish was 19 (11 females and 8 males); and in the second batch, totally 20 parent fish (10 females and 10 males) were purchased. In order to eliminate the influence of the transport process on fish, the experimental fish were domesticated in an artificial lake before the experiment started. The quality of water in the lake was excellent and the dissolved oxygen was sufficient, which could ensure the basic living environment of the fish.

3. Implementation Steps of Experiments (1) A water pump was started to inject tap water into the annular water tank. When the water level in the water tank reached the experimental requirement, the pump was stopped to stop injecting water. The tap water in the water tank was kept still for 3 days to remove harmful substance, i.e. chlorine in the water. Water temperature and dissolved oxygen concentration were recorded every 3 hours in the period of being still, and impurities falling into the water tank were taken out of the water.

(2) The parent fish samples were transferred into the annular water tank after the experimental water was kept still for 3 days. In order to eliminate the influence of the transfer process on the fish, the fish were put into the water tank for 1 day before the experiment.

(3) Each group of experiments was started from the flow velocity set under the working condition 1, the flow velocity was accelerated to the working condition 2 after 1 day, and so on until the working condition 4. Water quality data were recorded every 2 hours during the experiment. When the fish were exhausted during the experiment, the water flow pushing equipment was stopped as soon as possible, and the experiment continued after the fish renewed their physical strength. During the experiment, spawns were collected every 6 hours, the duration of spawn collection was 10 minutes, and the number of spawns collected at each time was recorded. There were 30 flowmeters which were uniformly distributed in the annular water tank and used to measure the flow velocity under each working condition. The set working conditions were specifically as follows:

TABLE 1

| Working condition | Maximum flow velocity | Combination way of water flow pushing equipment |
|---|---|---|
| 1 | 1.0 m/s | First submersible pump + third submersible pump or second submersible pump + fourth submersible pump |
| 2 | 1.2 m/s | First submersible pump + third submersible pump + first flow pusher + second flow pusher or second submersible pump +fourth submersible pump + first flow pusher + second flow pusher |
| 3 | 1.4 m/s | First submersible pump + second submersible pump + third submersible pump + fourth submersible pump |
| 4 | 1.6 m/s | First submersible pump + second submersible pump + third submersible pump + fourth submersible pump + first flow pusher + second flow pusher |

(4) Affected by the temperature condition and the fatigue state of the fish at the later stage of the experiment, experiments were additionally performed aiming at the working conditions 3 and 4, the experiment time was adjusted to nighttime, the time for each working condition was 3 hours and the interval between the working conditions was 3 hours.

(5) The spawning situations of the parent fish under the stimulation of the maximum flow velocity under different working conditions were obtained.

4. Experimental Results

Flow velocity test results: After calculation of the actually measured flow velocity, the distribution in each zone is shown in Table 2.

TABLE 2

| Working condition | Maximum flow velocity (m/s) | Zone flow velocity (m/s) | | | |
|---|---|---|---|---|---|
| | | A and A' | B and B' | C and C' | D and D' |
| 1 | 1.0 | 0.262 | 0.983 | 0.590 | 0.580 |
| 2 | 1.20 | 0.497 | 1.227 | 0.731 | 0.344 |
| 3 | 1.40 | 0.488 | 1.417 | 0.856 | 0.591 |
| 4 | 1.60 | 0.731 | 1.603 | 1.100 | 0.300 |

Figure 6:
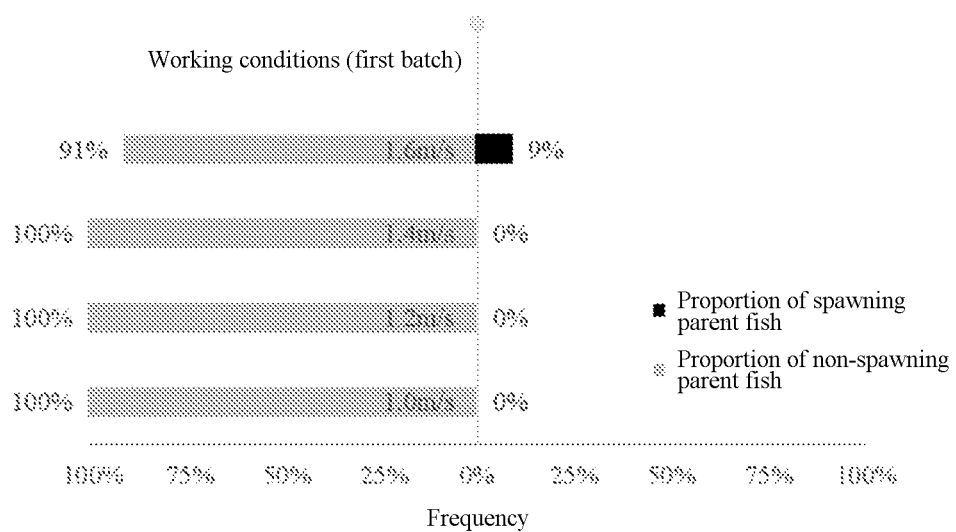
FIG. 6 is a schematic view of results of a first group of experiments.
Figure 7:
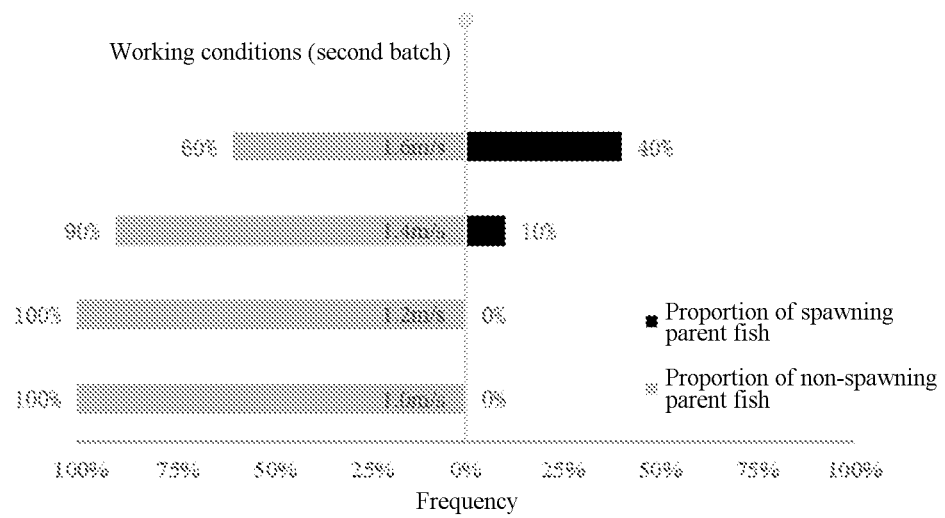
FIG. 7 is a schematic view of results of a second group of experiments.

During the two groups of experiments, it was observed that the spawning behavior of the parent fish occurred at flow velocity of 1.4 m/s and 1.6 m/s, and both spawns and egg membranes were collected, but the number and scale of spawns were different. In the first group of experiments, the number of egg membranes was 6 at 1.4 m/s, the number of egg membranes was 183 at 1.60 m/s, and it is speculated that the number of spawning parent fish was at least 1, which spawned at 1.60 m/s, accounting for 9% of the total sample size of female parent fish; and no spawning behavior was found under the stimulation of other flow velocity. In the second group of experiments, different spawning situations were observed under the stimulation of flow velocity of 1.4 m/s and 1.6 m/s, wherein the spawning situation was found after 2 hours of continuous stimulation of flow velocity of 1.4 m/s, totally 50 egg membranes were collected, and after field check, it was found that at least one female parent fish had the spawning behavior, accounting for 10% of all female fish samples; and under the stimulation of flow velocity of 1.6 m/s, a large-scale spawning situation occurred, 600 spawns were collected within 10 minutes, and it is speculated that the number of spawning parent fish is five, accounting for 40% of all female fish samples. The proportion of spawning parent fish under the stimulation of different flow velocity is illustrated in FIG. 6 and FIG. 7. The water temperature and maturity conditions of the parent fish in the first group of experiments were different from that in the second group of experiments, which resulted in different data results. However, it can still be concluded from the results that the spawning of the parent fish is closely related to the flow velocity, and that the spawning of the parent fish could only occur under the stimulation of specific water flow velocity.

What is claimed is:

1. An experimental device for studying a quantitative relationship between spawning of parent fish and stimulation of flow velocity, the experimental device comprises:
   an annular water tank system having:
      a first arc-shaped water tank,
      a first special-shaped water tank,
      a second arc-shaped water tank, and
      a second special-shaped water tank
   wherein the first arc-shaped tank, the first special-shaped water tank, the second arc-shaped water tank, and the second special-shaped water tank are sequentially connected head to tail; and
   wherein an outer perimeter of the tank system is 70 m to 110 m;
   wherein inner walls of both the first special-shaped water tank and the second special-shaped water tank are flat;
   wherein widths between outer walls and the inner walls of both the first special-shaped water tank and the second special-shaped are gradually increased from the two ends to the middle; and
   wherein water flow pushing equipment is placed in the first special-shaped water tank and the second special-shaped water tank such that the water flow pushing equipment enables a maximum water flow velocity in the water tank to reach a preset value;
   wherein the outer wall of the first special-shaped water tank consists of a first inclined wall, a first straight wall, and a second inclined wall, wherein the first inclined wall, the first straight wall, and the second inclined wall are sequentially connected, and the first straight wall is parallel to the inner wall of the first special-shaped water tank, the first inclined wall is connected with the outer wall of the first arc-shaped water tank, and the second inclined wall is connected with the outer wall of the second arc-shaped water tank; and
   wherein the outer wall of the second special-shaped water tank consists of a third inclined wall, a second straight wall and a fourth inclined wall, wherein the third inclined wall, the second straight wall and the fourth inclined wall are sequentially connected, the second straight wall is parallel to the inner wall of the second special-shaped water tank, the third inclined wall is connected with the outer wall of the first arc-shaped water tank, and the fourth inclined wall is connected with the outer wall of the second arc-shaped water tank.

2. The experimental device for studying a quantitative relationship between spawning of parent fish and stimulation of flow velocity according to claim 1,
   wherein each of the first arc-shaped water tank and the second arc-shaped water tank has an outer wall radius of 7 m to 12 m, a width of 0.5 m to 1.2 m, and a depth of 1 m to 2 m;
   and each of the first and second special-shaped water tank has a length of 11 m to 20 m, a width of 1 m to 2.5 m, and a depth of 1 m to 3 m.

3. The experimental device for studying a quantitative relationship between spawning of parent fish and stimulation of flow velocity according to claim 2,
   wherein an included angle θ1 between the first inclined wall and the inner wall of the first special-shaped water tank satisfies 50°≤θ1≤30°;
   an included angle θ2 between the second inclined wall and the inner wall of the first special-shaped water tank satisfies 50°≤θ2≤30°;
   an included angle θ3 between the third inclined wall and the inner wall of the second special-shaped water tank satisfies 50°≤θ3≤30°;
   an included angle θ4 between the fourth inclined wall and the inner wall of the second special-shaped water tank satisfies 50°≤θ4≤30°.

4. The experimental device for studying a quantitative relationship between spawning of parent fish and stimulation of flow velocity according to claim 1, wherein a first baffle is arranged along a length direction in the first special-shaped water tank, the first baffle comprising two ends, and the two ends of the first baffle are respectively connected to the outer wall of the first special-shaped water tank by fish stopping nets;

and a second baffle is arranged along a length direction in the second special-shaped water tank, the second baffle comprising two ends, and the two ends of the second baffle are respectively connected to the outer wall of the second special-shaped water tank by fish stopping nets.

5. The experimental device for studying a quantitative relationship between spawning of parent fish and stimulation of flow velocity according to claim 4, wherein a first flow pusher is placed in an area surrounded by the first baffle, the outer wall of the first special-shaped water tank, and the fish stopping nets;

and a second flow pusher is placed in an area surrounded by the second baffle, the outer wall of the second special-shaped water tank, and the fish stopping nets.

6. The experimental device for studying a quantitative relationship between spawning of parent fish and stimulation of flow velocity according to claim 5, wherein a first submersible pump is arranged at a junction of the first special-shaped water tank and the first arc-shaped water tank, a second submersible pump is arranged at a junction of the first special-shaped water tank and the second arc-shaped water tank, a third submersible pump is arranged at a junction of the second special-shaped water tank and the second arc-shaped water tank, a fourth submersible pump is arranged at a junction of the second special-shaped water tank and the first arc-shaped water tank, and each of the submersible pumps and the flow pushers are the water flow pushing equipment.

7. An experimental method for studying a quantitative relationship between spawning of parent fish and stimulation of flow velocity, comprising:

(1) providing the experimental device of claim 1;

(2) injecting water into the experimental device to enable the a water level in the tank to meet an experimental requirement, and removing impurities and harmful substances in the water;

(3) transferring parent fish samples into the experimental device to adapt for 6 hours or more;

(4) alternately selecting a plurality of velocity respectively as maximum flow velocity for each working condition in a range of velocities suitable for the parent fish to survive;

(5) starting water flow pushing equipment to enable the maximum flow velocity of a water flow to reach a preset value according to set working conditions, executing for 2 hours to 2 days under each working condition, respectively recording the a spawning situation of the parent fish under each working condition, simultaneously monitoring water quality and parent fish behaviors in real time, cleaning in time or changing water when the water quality is lower than a preset value, stopping the water flow pushing equipment to suspend the experiment when the parent fish are exhausted, and continuing the experiment after the parent fish renew physical strength; and (6) performing sorting to obtain the spawning situation of the parent fish under the stimulation of maximum flow velocity under each working condition.

8. The experimental method for studying a quantitative relationship between spawning of parent fish and stimulation of flow velocity according to claim 7, wherein the total number of the working conditions is four, and the maximum flow velocity under each working condition and combinations of water flow pushing equipment that need to be started in order to reach the maximum flow velocity are specifically shown in the following table:

| Working condition | Maximum flow velocity | Combination way of water flow pushing equipment |
|---|---|---|
| 1 | 1.0 m/s | First submersible pump + third submersible pump or second submersible pump + fourth submersible pump |
| 2 | 1.2 m/s | First submersible pump + third submersible pump + first flow pusher + second flow pusher or second submersible pump + fourth submersible pump + first flow pusher + second flow pusher |
| 3 | 1.4 m/s | First submersible pump + second submersible pump + third submersible pump + fourth submersible pump |
| 4 | 1.6 m/s | First submersible pump + second submersible pump + third submersible pump + fourth submersible pump + first flow pusher + second flow pusher. |

* * * * *